(12) United States Patent
Hu et al.

(10) Patent No.: US 11,055,334 B2
(45) Date of Patent: Jul. 6, 2021

(54) SYSTEM AND METHOD FOR ALIGNING MESSAGES TO AN EVENT BASED ON SEMANTIC SIMILARITY

(75) Inventors: Yuheng Hu, Tempe, AZ (US); Ajita John, Holmdel, NJ (US); Doree Duncan Seligmann, New York, NY (US)

(73) Assignee: Avaya Inc., Basking Ridge, NJ (US)

( * ) Notice: Subject to any disclaimer, the term of this patent is extended or adjusted under 35 U.S.C. 154(b) by 1039 days.

(21) Appl. No.: 13/370,488

(22) Filed: Feb. 10, 2012

(65) Prior Publication Data

US 2013/0081056 A1    Mar. 28, 2013

Related U.S. Application Data

(60) Provisional application No. 61/538,579, filed on Sep. 23, 2011.

(51) Int. Cl.
*G06F 16/35* (2019.01)

(52) U.S. Cl.
CPC .................. *G06F 16/35* (2019.01)

(58) Field of Classification Search
None
See application file for complete search history.

(56) References Cited

U.S. PATENT DOCUMENTS

| | | | |
|---|---|---|---|
| 7,130,837 B2 * | 10/2006 | Tsochantaridis | G06F 17/30616 706/45 |
| 7,475,061 B2 * | 1/2009 | Bargeron et al. | |
| 7,567,709 B2 * | 7/2009 | Lim et al. | 382/176 |
| 7,801,910 B2 * | 9/2010 | Houh et al. | 707/765 |
| 8,073,794 B2 * | 12/2011 | Amer-Yahia et al. | 706/45 |
| 8,180,778 B1 * | 5/2012 | Pedersen | G06F 17/3089 707/739 |
| 8,311,330 B2 * | 11/2012 | Prabhakara et al. | 382/173 |
| 8,533,208 B2 * | 9/2013 | Sundaresan et al. | 707/755 |
| 8,645,298 B2 * | 2/2014 | Hennig et al. | 706/45 |
| 9,710,454 B2 * | 7/2017 | Shamma | H04L 51/32 |

(Continued)

OTHER PUBLICATIONS

The new York times, "N-gram probabilities to estimate the likelihood of words in corpus to evaluate the information content". (Year: 2008).*

(Continued)

*Primary Examiner* — Doon Y Chow
*Assistant Examiner* — Phuong N Hoang
(74) *Attorney, Agent, or Firm* — Sheridan Ross P.C.

(57) ABSTRACT

Disclosed are systems, methods, and non-transitory computer-readable storage media for analyzing an event via social media. A system configured to practice the method segments a document associated with an event based on a plurality of inferred topics to yield a plurality of segments. Next, the system assigns each message in a corpus of messages associated with the event to one of the inferred topics to yield assigned topics. The messages can include at least one of a status update, a tweet, a blog post, a tag, a chat message, a comment, and a check-in. Moreover, the messages can originate from different social networks. Based on the assigned topics, the system then associates each message in the corpus of messages with at least one of the document, a segment from the plurality of segments, and a segment of the event.

20 Claims, 9 Drawing Sheets

(56) References Cited

U.S. PATENT DOCUMENTS

| | | | | |
|---|---|---|---|---|
| 2007/0118518 | A1* | 5/2007 | Wu | G06F 16/345 |
| 2009/0319518 | A1* | 12/2009 | Koudas | G06F 17/30864 |
| 2010/0280985 | A1* | 11/2010 | Duchon | G06Q 10/10 706/52 |
| 2011/0207482 | A1* | 8/2011 | Shamma | H04L 51/32 455/466 |
| 2011/0258188 | A1* | 10/2011 | AbdAlmageed | G06F 17/30796 707/736 |
| 2012/0102021 | A1* | 4/2012 | Hill et al. | 707/711 |
| 2012/0166179 | A1* | 6/2012 | Tirumalachetty et al. | 704/9 |
| 2012/0166438 | A1* | 6/2012 | Wu | G06F 17/3064 707/737 |

OTHER PUBLICATIONS

AlSumait, "Topic Significance Ranking of LDA Generative Models", discloses topic models to generate corpora topics and subdivide the corpus to find important topics. (Year: 2009).*

Blei, David M., Andrew Y. Ng, and Michael I. Jordan, "Latent Dirichlet Allocation", http://www.cs.princeton.edu/~blei/papers/BleiNgJordan2003.pdf, Journal of Machine Learning Research 3 (2003), pp. 993-1022.

Diakopoulos, Nicholas, Mor Naaman, and Funda Kivran-Swaine, "Diamonds in the Rough: Social Media Visual Analytics for Journalistic Inquiry", http://www.nickdiakopoulos.com/wp-content/uploads/2007/05/diamonds-in-the-rough_VAST_cr1.pdf, Rutgers University, School of Communication and Information, pp. 1-8.

Geman, Stuart and Donald Geman, "Stochastic Relaxation, Gibbs Distributions, and the Bayesian Restoration of Images", http://www.stat.cmu.edu/~acthomas/724/Geman.pdf, IEEE, 1984, pp. 721-741.

Griffiths, Thomas L., Mark Steyvers, David M. Blei, and Joshua B. Tenenbaum, "Integrating Topics and Syntax", http://cocosci.berkeley.edu/tom/papers/composite.pdf, pp. 1-8.

Hoffman, Thomas, "Probabilistic Latent Semantic Indexing, Proceedings of the Twenty-Second Annual International SIGIR Conference on Research and Development in Information Retreival", http://www.cs.brown.edu/~th/papers/Hofmann-SIGIR99.pdf, International Computer Science Institute, Berkeley, CA and EECS Department, CS Division UC Berkeley, pp. 1-8.

Robertson et al., "Okapi at TREC-3", http://www.computing.dcu.ie/~giones/Teaching/CA437/city.pdf, Centre for Interactive Systems Research, Department of Information Science, City University, Northampton Square, London EC1V 0HB, UK, pp. 1-19.

Zhao, W.X. et al., "Comparing Twitter and Traditional Media Using Topic Models", http://sewm.pku.edu.cn/TianwangLiterature/2011/2011-ECIR-Comparing%20Twitter%20and%20Traditional%20Media%20Using%20Topic%20Models%20pdf. Springer-Verlag Berlin Heidelberg, 2011, pp. 338-349.

* cited by examiner

| Segment id | Topic Words |
|---|---|
| 1 | you heard thank month much who applaus she go man feel opportun recent seat hillari |
| 2 | we region chang unit effort forc squar even advanc decad partner opposi answer access futur |
| 3 | hi citizen repres war violenc been freedom protest all take stratgi start syrian long courag |
| 4 | you heard thank month much who applaus she go man feel opportun recent seat hillari |
| 5 | come end time like place too week free befor credibl awai major becaus elec violent |
| 6 | we region chang unit effort forc squar even advanc decad partner opposi answer access futur |
| 7 | democrat egypt help invest work alli leav job idea corrup move market fund modern billion |
| 8 | palestinian secur israel isra know negoti arab between leader resolv itself issu on region parti |
| 9 | who those more make word togeth which talk tell each alon perman tri ahead educ |
| 10 | you heard thank month much who applaus she go man feel opportun recent seat hillari |

FIG. 6

| | Tid | Message |
|---|---|---|
| Specific Segment | 1 | why sanction bahrain why syria why we need honest answer |
| | 2 | Obama: It's not America that put people into the streets of Tunis and Cairo? it was the people themselves??? |
| | 3 | #Syria #Freedom #Bashar # Assad must step down!!! and be tried 4 #War #Crimes #Justice General Tweets |
| General Speech | 1 | Obama on bin Laden: he rejected democracy even before his death, al Qaeda was losing its struggle for relevance??? |
| | 2 | The President speaks on the Middle East- North Africa, U.S. policy in region. |

FIG. 7

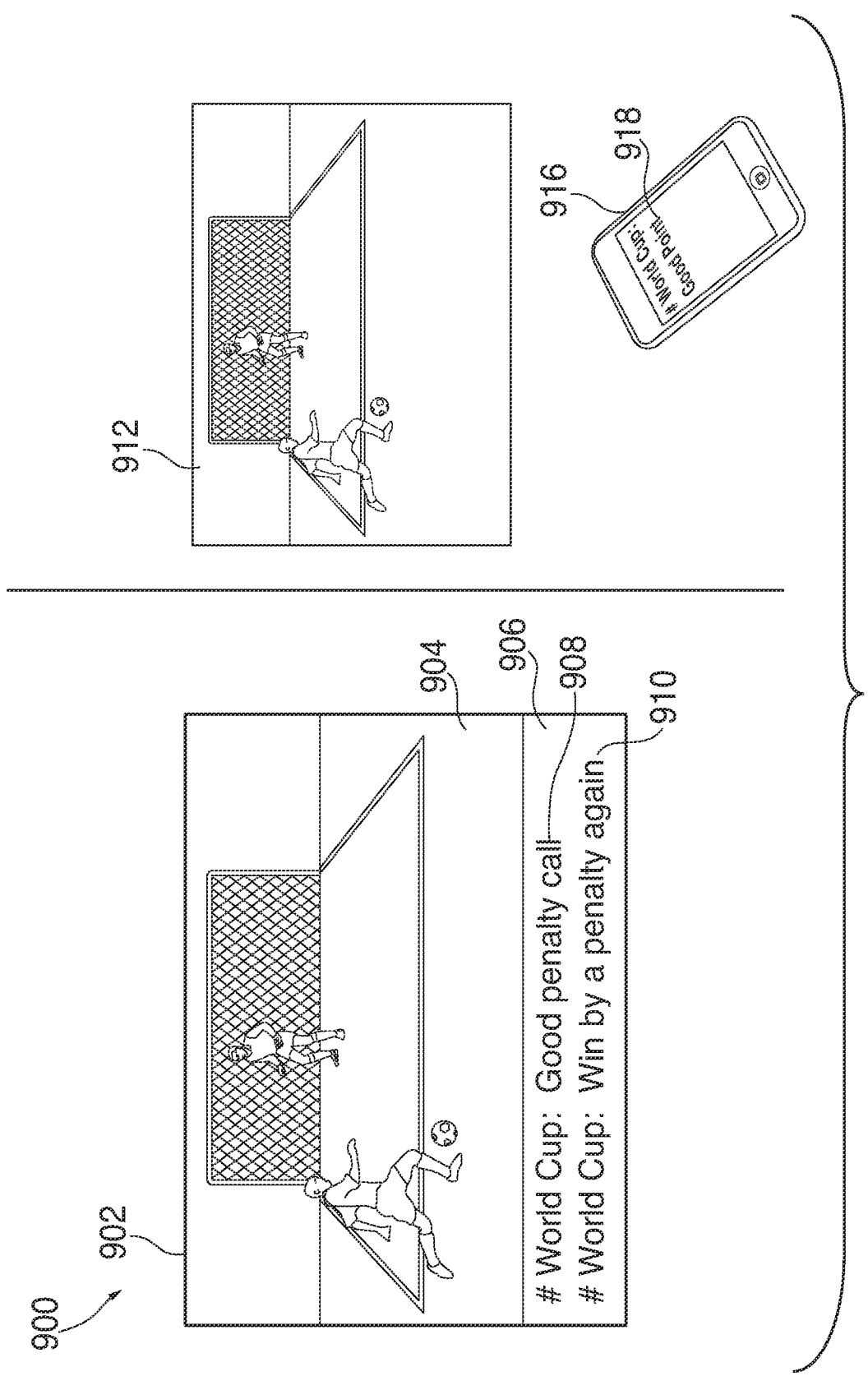

US 11,055,334 B2

SYSTEM AND METHOD FOR ALIGNING MESSAGES TO AN EVENT BASED ON SEMANTIC SIMILARITY

PRIORITY CLAIM

This application claims priority to U.S. Provisional Patent Application No. 61/538,579, filed 23 Sep. 2011, the contents of which are incorporated herein by reference in their entirety.

BACKGROUND

1. Technical Field

The present disclosure relates to social media posts and more specifically to matching social media posts to an event.

2. Introduction

Social media systems such as Twitter and Facebook have emerged as valuable platforms for providing real-time feedback about media events, like the U.S. President's State of the Union addresses, presidential debates, sporting events, and other public or social experiences. To foster this type of interaction, event organizers, such as the White House and media broadcasting companies, often publish and promote a specific keyword (e.g., a hashtag on Twitter) which can be used to tag social media posts in order to identify/associate the media posts with the specific event or discussion. For example, during President Obama's May 19, 2011 speech on the Middle East, several thousand tweets were posted with the hashtag #MESpeech, which the White House had previously published for the speech. These tweets contributed additional information to the event: they provided user feedback, responses, and interactions.

As illustrated in the previous example, social media can greatly enrich the user experience associated with an event, both for the live event and playback of the recorded event. Social media can extend the scope of participation, the diversity of ideas, and the amount of information. But the burst of information from thousands or even millions of users can be overwhelming, and making sense of the mass of information can be extremely difficult, both at an individual and aggregate level of analysis.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The approaches set forth herein analyze feedback on events contributed by users through social media. These approaches apply analytical methods on information from shared events, such as public speeches, and social posts, such as tweets from Twitter, to provide a deeper understanding of the feedback of individuals on events through social media. In particular, the system develops a joint Latent Dirichlet allocation (LDA) model of the social media messages posted by users and portions of an event, such as paragraphs from a speech, based on their topical connections. Unlike the standard implementation of LDA, which is applied at the document level and is unable to extract specific messages (i.e., messages that relate to a specific portion of the event), the joint LDA model provides segmentation at a topic level, thus enabling the identification of messages that relate to specific segments of the event.

The joint statistical model explores the associations between the social media messages and portions of the event at a topic level, rather than word level, since users often respond at a high level, and the messages and portions may not always share the same lexicon—though syntactically different words may share similar topics. For example, an experimental analysis of President Obama's May 19, 2011 speech on the Middle East and a sample of 800 tweets contributed during and after the speech shows that some users on Twitter comment directly on a specific paragraph of a speech, while others comment on general topics of the event. In addition, the tweets that directly comment on a specific paragraph in the speech are related to topics of high interest in the speech.

These approaches can make sense of social media content contributed around broadcasted public events. For instance, the system can identify a topic of social media information that was contributed during an event, and determine if a post is directed to a particular part of the event. The system can also identify specific parts of the event that drew the most postings. As an example, the organizers of the 2012 Super Bowl can promote the use of one or more hashtags relating to the 2012 Super Bowl, such as #SB2012, #SB2012Patriots, #SB2012Ravens, and #SB2012halftime. Users can use these hashtags when they tweet in reference to the 2012 Super Bowl. The system can then analyze tweets containing those hashtags to make sense of the user feedback on the 2012 Super Bowl. The system can also analyze other tweets that have semantically similar information and/or are otherwise associated with the event.

Disclosed are systems, methods, and non-transitory computer-readable storage media for analyzing an event via social media. A system configured to practice the method segments a document associated with an event based on a plurality of inferred topics to yield a plurality of segments. Next, the system assigns each message in a corpus of messages associated with the event to one of the inferred topics to yield assigned topics. The system can assign each message to one of the inferred topics based on an LDA analysis. The messages can include at least one of a status update, a tweet, a blog post, a tag, a chat message, a comment, and a check-in. Moreover, the messages can originate from different social networks and different users, which may or may not be socially connected to each other outside of the common experience with the event. For example, the system can use tweets and Facebook wall posts in the same corpus.

Based on the assigned topics, the system then associates each message in the corpus of messages with at least one of the document, a segment from the plurality of segments, and a segment of the event. In one embodiment, the system implements a joint LDA model at a segment level, rather than document level, thus enabling the identification of messages that relate to specific portions of the event. Also, the system can optionally rank the plurality of segments based on how many messages are associated with each segment in the plurality of segments. The system can also analyze and consider other factors, such as time, location, frequency, metadata, syntax, user information, and so forth.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 6 illustrates an exemplary segmentation of a transcript based on temporal topic changes;

FIG. 7 illustrates an example of an inferred topical association between a speech and a set of tweets;

FIG. 9 illustrates an example of an event augmented with a display of related tweets.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Figure 1:
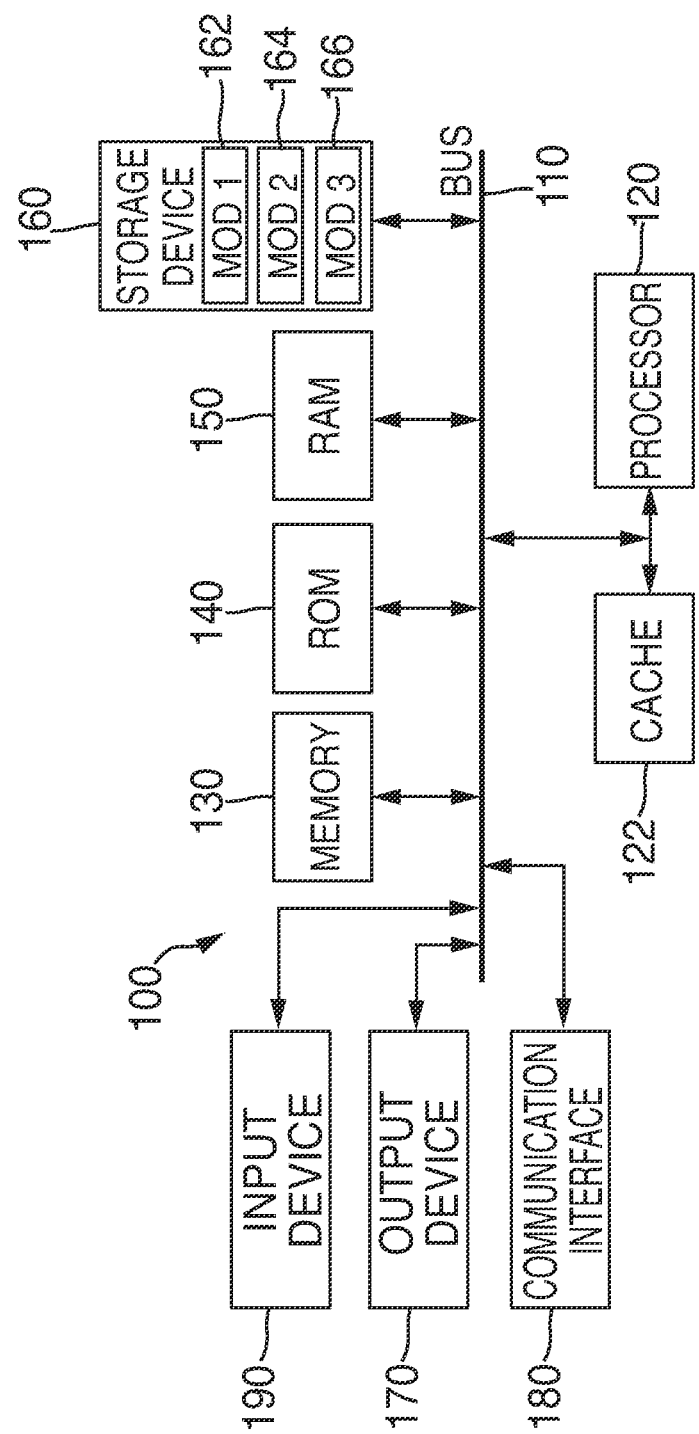
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output system (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer-readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod 1 162, Mod 2 164 and Mod 3 166 which are modules configured to control the processor 120. These modules may be stored on the storage device 160 and loaded into RAM 150 or memory 130 at runtime or may be stored as would be known in the art in other computer-readable memory locations.

Figure 2:
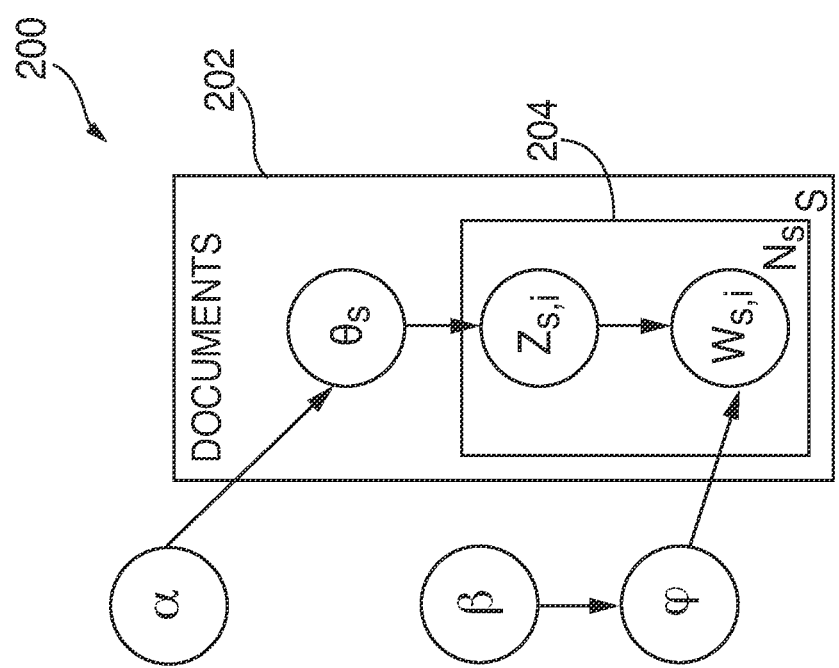
FIG. 2 illustrates a Latent Dirichlet allocation model for extracting topics from a document.

Having disclosed some components of a computing system, the disclosure now turns to FIG. 2, which illustrates a Latent Dirichlet allocation (LDA) model 200 for extracting topics from a document. LDA is a type of statistical model for discovering abstract "topics" that occur in documents. LDA models a generating process of a document from the user's perspective and infers the latent topics based on observed words in the document. The obtained topics can then be used to explain the occurrences of words in the document. For example, for a tweet that mentions the word "Obama," LDA can identify its latent topic, "U.S. President," based on the statistics of the two terms—Obama and U.S. President—in a collection of documents.

In FIG. 2, the LDA model 200 is illustrated using plate notation. The outer plate 202 represents documents, and the inner plate 204 represents the repeated choice of topics and words within a document. In this example, S denotes the number of documents in the outer plate 202, and $N_s$ denotes the number of words in the inner plate 204. Accordingly, α is the hyperparameter of the document topic distribution, φ is the hyperparameter of the word topic distribution, β is another hyperparameter, $\theta_s$ is the topic mixture of the document s, $W_{s,i}$ is the i-th word in document s, and $Z_{s,i}$ is the topic of word $W_{s,i}$.

The LDA model 200 can be built by first building a way to generate documents from a user's perspective and, second, inferring the model parameter using inference algorithms. In the first step, the topic mixtures $\theta_s$ are sampled from a prior Dirichlet distribution Dir(α) for each document s, where α is the parameter of the document topic distribution. Next, a word distribution φ is sampled from its prior topic mixture according to a Multinomial. Each word w is then generated through a Multinomial based on its word distribution $\varphi_z$.

The procedure for building the LDA model 200 can alternatively include choosing a distribution of topics $\theta_s$~Dir(α), then, for each word i in document s, choosing the topic $z_{s,i}$~Multi($\theta_s$) and the word $w_{s,i}$~Multi($^{SM}z_{s,i}$).

Once the LDA model 200 is defined, as mentioned earlier, the second step is to infer the model parameters. Here, various inference algorithms, such as sampling-based and variational algorithms, can be used to infer the model parameters. For example, a Markov chain Monte Carlo (MCMC) algorithm can be used for inference with the LDA model 200. A detailed discussion of an example Gibbs sampling algorithm is provided below in the discussion of FIG. 3.

Figure 3:
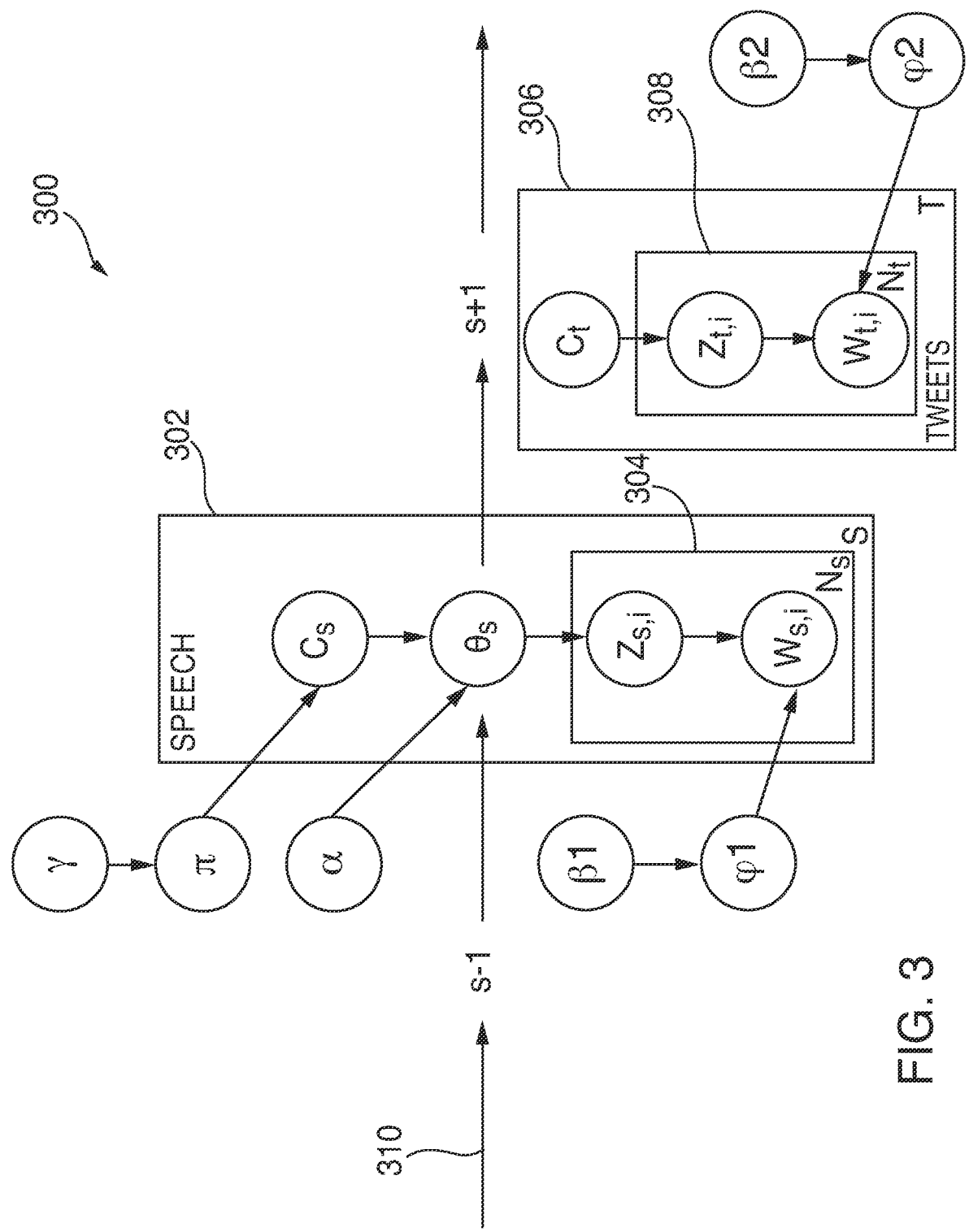
FIG. 3 illustrates an exemplary joint statistical model of a speech and a collection of tweets.

FIG. 3 illustrates an exemplary joint statistical model 300 of a speech and a collection of tweets. The joint statistical model 300 jointly models the topic segmentation of an event and topics within associated messages. The joint statistical model 300 can be based on an LDA model. However, unlike the standard implementation of LDA, which is applied at the document level, the joint statistical model 300 provides segmentation at a topic level, thus enabling the identification of messages that relate to specific portions of the event.

In one embodiment, the joint statistical model 300 jointly models the topic segmentation of a transcript and topics within associated messages, such as social messages. In another embodiment, the joint statistical model 300 jointly models the topic segmentation of a description and/or summary of an event and a collection of messages relating to the event to model their topical connections. Here, the description/summary of an event can be, for example, a television commentary of a sports game. Further, the description and/or summary can be a time-based description/summary of the contents of a video, an image, an audio, and/or an event. Also, the description and/or the summary can be generated automatically based on video, audio, image and/or text analysis.

In FIG. 3, the joint statistical model 300 jointly models the topic segmentation of a speech, and two distinct types of topics within associated tweets. Here, the speech is formed by discrete sequentially-ordered segments, each of which discusses a particular set of topics. A segment includes one or more coherent paragraphs available from a text associated with the event, such as a transcript, a description, a summary, a report, an article, and so forth. The joint statistical model 300 provides a generative process for creating the segments. In one embodiment, each paragraph in the speech is generated from a particular distribution of topics, where each topic is a probability distribution over a vocabulary. A Markov assumption is then applied to the distribution over topics covered in the speech: with some probability, the topic distribution for paragraph s is the same as the previous paragraph s; otherwise, a new distribution is sampled over topics for s. This pattern of dependency can be produced, for example, by associating a variable, such as a binary variable, with each paragraph in the speech, indicating whether a paragraph's topic is the same or different as that of the previous paragraph. If the topic remains the same, the paragraphs having the same topic are merged to form a segment.

With respect to the collection of tweets, the tweets include words which can belong to two distinct types of topics: general topics, which are high-level topics that are constant across the speech; and specific topics, which are concrete and relate to specific segments of the speech. A tweet in which most words belong to general topics can be defined as a steady or general tweet, indicating a weak topical influence from the event. On the other hand, a tweet with more words about the specific topics can be defined as an episodic or specific tweet, indicating a strong topical influence from a segment of the speech.

Similar to the speech segmentation, composing the tweets also follows a generative process defined in the joint statistical model 300. Here, the distribution of general topics is fixed for a tweet, since the tweet is a response tagged with an official hashtag of the speech and thus must be related to the speech. On the other hand, the distribution of specific topics varies with respect to the evolution of the event, since specific topics reflect more directed responses. Thus, for example, when a person wants to compose a tweet to comment on the on-going speech, the person has two choices for picking the appropriate words: with some probability, a word w is sampled from the mixture of general topics about the speech; otherwise, it is sampled from the mixture of specific topics which occurs "locally" in the parts of the speech referred to in w. The second case comports with the belief that the audience of the speech may be influenced by a set of topics that are covered by a particular part of the speech, such as a segment of the speech. Thus, when a person picks a word to respond to a particular part of the speech, the topic of the word is likely a topic that appeared in that particular part of the speech.

For example, consider the following tweet posted at the beginning of President Obama's Middle East speech: "Sec Clinton introducing President Obama on #Mideast #StateDept #MESpeech." This tweet can be viewed as a mixture of general topics, "Middle East," that was shared across collection of tweets (words: "#Mideast" and "#MESpeech"), and a specific topic, "Foreign policy," which is sensitive to the part of the event when the Secretary of State, Hillary Clinton, was introducing President Obama (words: "Sec", "Clinton" and "#StateDept").

Similar to the segmentation of the speech, the preference of specific topics versus general topics can be controlled by a variable, such as a binary variable, associated with each word of a tweet. For added context, the tweets can also be expanded with additional information. For example, the tweets can include snippets from queries to an Internet search engine, which can provide additional context. Thus, a tweet with a few words, such as "US State Department," can be expanded for context to include the words "Hillary Clinton," for example.

The joint statistical model 300 is illustrated in FIG. 3 using plate notation. The outer plate 302 represents paragraphs in the speech, and the inner plate 304 represents topics and words within a paragraph. Further, the outer plate 306 represents a collection of tweets, and the inner plate 308 represents the topics and words within a tweet. Thus: $\alpha$ is the hyperparameter of the paragraph topic distribution; $\varphi$ is the hyperparameter of the word topic distribution; $\beta 1$, $\beta 2$, $\pi$ and $\gamma$ are hyperparameters; $C_s$ is a binary variable that controls the topic change for a speech paragraph s; $C_t$ is a binary variable that controls if the topic mixture for a tweet t is from a speech paragraph or the collection of tweets; $\theta_s$ is the topic mixture of the speech paragraph s along the time dimension 310; $W_{s,i}$ is the i-th word in speech paragraph s; and $Z_{s,i}$ is the topic of word $W_{s,i}$.

The procedure for building the joint statistical model 300 can be described as follows. First, for each paragraph s of the speech, choose its topic mixture:

$\theta_s \sim \delta(\theta_{s-1}, \theta_s)$, if $C_s=0$, its topic mixture follows a previous paragraph (i.e., the paragraph is in the same segment); and $\theta_s \sim \text{Dir}(\alpha)$, $C_s=1$ (i.e., a new segment starts here).

Then, for each word i in paragraph s:

choose topic $z_{s,i} \sim \text{Multi}(\theta_s)$; and choose word $w_{d,i} \sim \text{Multi}(\theta_{z_{d,i}})$.

Next, for each tweet t relating to paragraph s:

$\theta_{t,s} \sim \delta(\theta_{t,s}, \theta_s)$, if $C_t=0$, its topic mixture is the same as the topic mixtures of its associated paragraph; and $\theta_{t,s} \sim \text{Dir}(\alpha_{t,s})$, $C_t=1$, its topic mixture is sampled from the topic distribution of the collection of tweets.

Finally, for each term i in tweet t relating to paragraph s:

choose topic $z_{t,i,s} \sim \text{Multi}(\theta_{t,s})$; and choose word $w_{t,i,s} \sim \text{Multi}(\varphi_{z_{t,i,s}})$.

Once the joint statistical model 300 is defined, the next step is to infer its parameters. The inference steps can be performed using an inference algorithm, such as a Markov Chain Monte Carlo algorithm. In one embodiment, the inference steps are performed using Gibbs sampling. Here, Gibbs sampling is used to produce a sample from a joint distribution when only conditional distributions of each variable can be efficiently computed. The variables are sequentially sampled from their distributions conditioned on all other variables in the model. Such a chain of model states converges to a sample from the joint distribution.

When performing Gibbs sampling, the joint probability of all variables in the joint statistical model 300 are first computed: $P(w_s, wt, z_s, z_t, c_s, c_t)$, which is equivalent to $P(c_s) P(c_t) P(w_s|z_s) P(w_t|z_t) P(z_s, z_t|c_s, c_t)$. Then, each probability is calculated separately.

For example, the probability for the binary variable for each paragraph in speech $P(c_s)$ is computed according to the following equation:

$$P(c_s) = P(c_s|\pi)P(\pi)d\pi \qquad \text{Equation 1}$$
$$= \frac{\Gamma(2\gamma_s)}{\gamma_s^2} \frac{\Gamma(n_1^s + \gamma_s)(\Gamma(n_0^s + \gamma_s)}{\Gamma(N^s + 2\gamma_s)}$$

where $P(c_s|\pi)$ is a Bernoulli, $P(\pi)$ is Beta prior with hyperparameter $\pi$, $n_0^s$ is the number of paragraphs whose topic is the same as the topic of a previous paragraph (i.e., $c_s=0$), $n_1^s$ is the number of sentences whose topic is different than the topic of the previous paragraph (i.e., $C_s=1$), and $N^s=n_0^s+n_1^s$ is the total number of paragraphs in the speech.

Similarly, the probability for the binary variable for tweets $P(c_t)$ is computed according to the following equation:

$$P(c_t) = \prod_{i=1}^{S} \frac{\Gamma(2\gamma_t)}{\gamma_t^2} \frac{\Gamma(n_1^{t(i)} + \gamma_t)(\Gamma(n_0^{t(i)} + \gamma_t)}{\Gamma(N^{t(i)} + 2\gamma_t)} \qquad \text{Equation 2}$$

where S is the number of paragraphs in the speech, $n_0^t$ is the number of tweets whose $c_t=0$ (i.e., specific tweets), $n_1$ is the number of tweets whose $c_t=1$ (i.e., general tweets), and $N^t=n_0^t+n_1^t$ is the total number of tweets.

Next, $P(w_s|z_s)$ is defined by the equation below:

$$P(w_s|z_s) = \left(\frac{\Gamma(W_s\beta_s)}{\Gamma(\beta_s)^W}\right)^{k_s} \prod_{k=1}^{K_s} \frac{\prod_{w=1}^{W_s} \Gamma(n_w^k + \beta_s)}{\Gamma(n_{(\cdot)}^k + W_s\beta_s)} \qquad \text{Equation 3}$$

where $w_s$ is a word vector and $z_s$ is a topic vector, $n_w^k$ is the number of times topic k is assigned to word w, $n_{(\cdot)}^k$ is the number of times topic k is assigned to any word, and $W_t$ is the vocabulary size of the speech corpus.

Similarly, $P(w_t|z_t)$ is computed according to the following equation:

$$\text{if } c_t = 0, \text{ then } P(w_t | z_t) = \left(\frac{\Gamma(W_t \beta_s)}{\Gamma(\beta_s)^W_t}\right)^{k_s} \prod_{k=1}^{K_s} \frac{\prod_{w=1}^{W_t} \Gamma(n_w^k + \beta_s)}{\Gamma(n_{(\cdot)}^k + W_t \beta_s)} \quad \text{Equation 4}$$

$$\text{if } c_t = 1, \text{ then } P(w_t | z_t) = \left(\frac{\Gamma(W_t \beta_t)}{\Gamma(\beta_t)^W_t}\right)^{k_t} \prod_{k=1}^{K_t} \frac{\prod_{w=1}^{W_t} \Gamma(n_w^k + \beta_t)}{\Gamma(n_{(\cdot)}^k + W_t \beta_t)}$$

Next, $P(z_s, z_t|c_s, c_t)$ is inferred according to the following equation:

$$P(z_s, z_t | c_s, c_t) = \quad \text{Equation 5}$$

$$\left(\frac{\Gamma(k_s \alpha_s)}{\Gamma(\alpha_s)^{k_s}}\right)^S \prod_{i=1}^{S} \frac{\prod_{k=1}^{K_s} \Gamma(n_k^{s_i} + nt_k^{s_i} + \alpha_s)}{\Gamma(n_{(\cdot)}^{s_i} + nt_{(\cdot)}^{s_i} + K_s \alpha_s)} \times \left(\frac{\Gamma(K_t \alpha_t)}{\Gamma(\alpha_t)^{k_t}}\right)^{N_\tau}$$

$$\prod_{i=1}^{N_\tau} \frac{\prod_{k=1}^{K_t} \Gamma(n_k^{t_i} + \alpha_t)}{\Gamma(n_{(\cdot)}^{t_i} + k_t \alpha_t)}$$

where S is a set of paragraphs of speech, and each element ($S_i$) in this set contains multiple sentences; $n_k^{s_i}$ is the number of times topic k is assigned to paragraphs in segment $S_i$; $nt_k^{s_i}$ is the number of times topic k is assigned to tweets which are specific to the paragraphs (i.e., $c_t=0$) which belong to the segment $S_i$; $N_\tau$ is a set of tweets that are general to the paragraphs; $|N_\tau|=\Sigma_{i=1}^N n_1^i$, where N is the total number of paragraphs of speech transcript; and $n_k^{t_i}$ is the number of times topic k is assigned to the general tweets.

Further, $P(z_s|w_s, w_t, z_t, c_s, c_t)$ can be computed by performing Gibbs sampling as illustrated in the following equation:

$$P(z_{d,i}^s | z_{-(d,i)}^s, z_t, w_s, w_t, c_s, c_t) \propto \frac{n_{d,i}^k + \beta_s}{n_{(\cdot)}^k + w_s \beta_s} \frac{n_k^{S_d} + nt_k^{S_d} + \alpha_s}{n_{(\cdot)}^{S_d} + nt_{(\cdot)}^{S_d} + K_s \alpha_s} \quad \text{Equation 6}$$

Also, $P(z_{d,i}^t|z_{-(d,i)}^t, z_s, w_s, w_t, c_s, c_t)$ can be computed by applying a similar treat for each word i in tweet d, as illustrated in the following equation:

$$\text{if } c_t = 0, \text{ then } P(z_{d,i}^t | z_{-(d,i)}^t, z_s, w_s, w_t, c_s, c_t) \propto \quad \text{Equation 7}$$

$$\frac{n_{d,i}^k + \beta_s}{n_{(\cdot)}^k + W_t \beta_s} \frac{n_k^{S_d} + nt_k^{S_d} + \alpha_s}{n_{(\cdot)}^{S_d} + nt_{(\cdot)}^{S_d} + K_s \alpha_s - 1}$$

$$\text{if } c_t = 1, \text{ then } P(z_{d,i}^t | z_{-(d,i)}^t, z_s, w_s, w_t, c_s, c_t) \propto$$

$$\frac{n_{d,i}^k + \beta_t}{n_{(\cdot)}^k + W_t \beta_t - 1} \frac{n_k^{t_d} + nt_k^{t_d} + \alpha_t}{n_{(\cdot)}^{t_d} + K_t \alpha_t - 1}$$

Moreover, the variable c can be derived by estimating $P(c_s|w_s, w_t, z_t, c_s, c_t)$, as illustrated in the following equation:

$$P(c_d^s | c_{(-d)}^s, w_s, w_t, z_t, z_s, c_t) = \frac{P(z_t, z_s | c^s, c_t)}{P(z_t, z_s | c_{(-d)}^s, c_t)} \cdot \frac{P(c^s)}{P(c_{(-d)}^s)} \quad \text{Equation 8}$$

Finally, for the binary variable of the collection of tweets, $P(c_d^t|c_{(-d)}^t, w_s, w_t, z_t, z_s, c_s)$ can be estimated as follows:

$$\text{if } c_d^s = 0, \text{ then } P(c_d^t | c_{(-d)}^t, w_s, w_t, z_t, z_s, c_t) = \quad \text{Equation 9}$$

$$\frac{\prod_{k=1}^{K_s} \Gamma(n_k^{S_d} + nt_k^{S_d} + \alpha_s - 1)}{\Gamma(n_{(\cdot)}^{S_d} + nt_{(\cdot)}^{S_d} + K_s \alpha_s)} \cdot \frac{n_0^t - 1 + \gamma t}{N^t - 1 + 2\gamma t}$$

$$\text{if } c_d^s = 1, \text{ then } P(c_d^t | c_{(-d)}^t, w_s, w_t, z_t, z_s, c_t) =$$

$$\left(\frac{\Gamma(K_t \alpha_t)}{\Gamma(\alpha_t)^{k_t}}\right) \frac{\prod_{k=1}^{K_t} \Gamma(n_k^{t_d} + \alpha_t)}{\Gamma(n_{(\cdot)}^{t_d} + K_t \alpha_t)} \cdot \frac{n_1^t - 1 + \gamma t}{N^t - 1 + 2\gamma t}$$

While the joint statistical model 300 is discussed herein in the context of a speech transcript and a collection of tweets, those of skill in the art will understand that the joint statistical model 300 can be applied in other contexts. For example, the joint statistical model 300 can be used to model events, articles, advertisements, announcements, messages, transcripts, media content, and so forth; as well as various types of user feedback, such as chats, messages, comments, status updates, check-ins, blog posts, emails, etc. Moreover, a time-based description and/or summary of the contents of a video, an image, an audio, and/or an event can be used to determine topics and associate messages to the event. The description/summary of the event can be automatically generated based on an analysis of the video, image, audio, and/or event.

Figure 4:
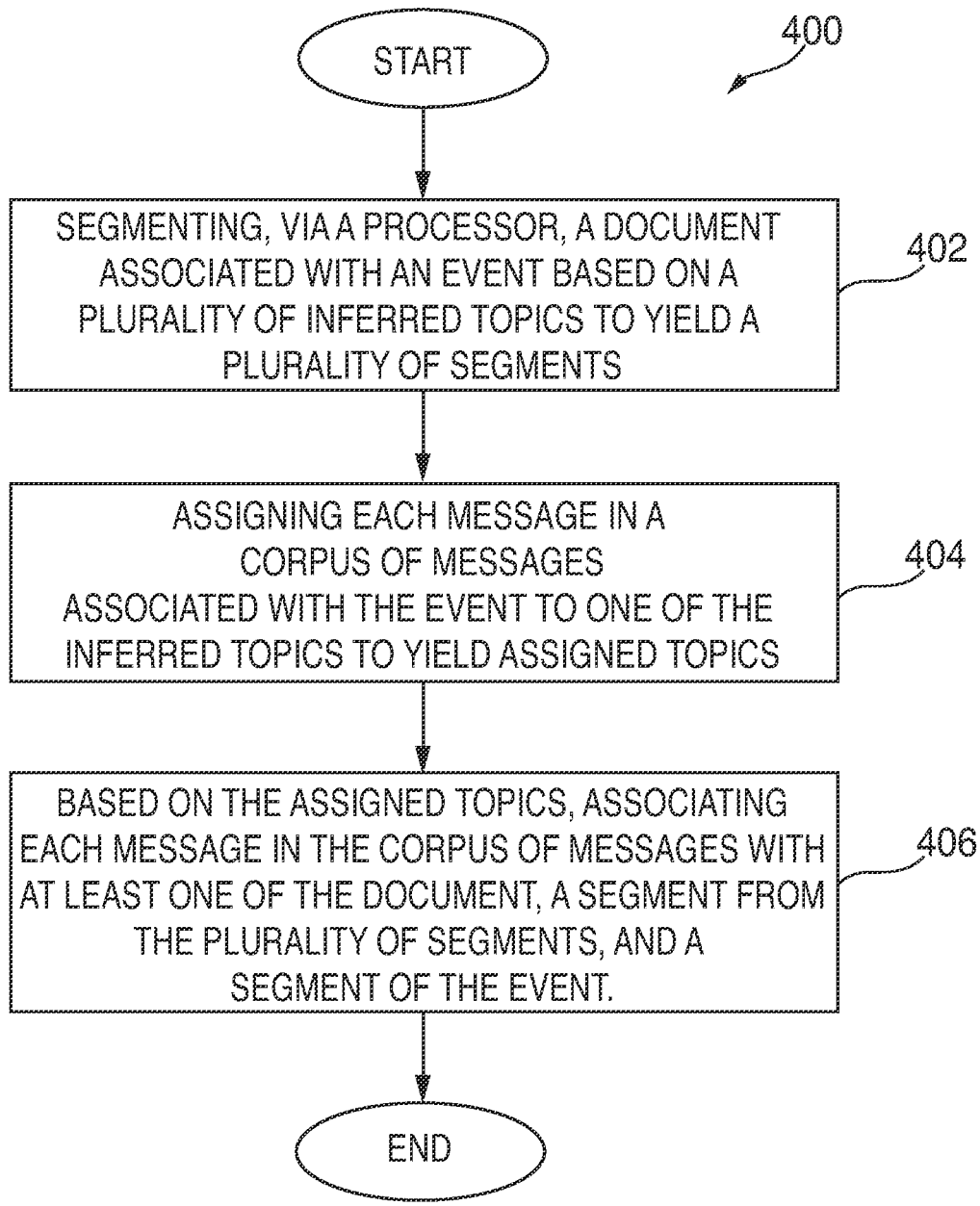
FIG. 4 illustrates an example method embodiment.

The disclosure now turns to the exemplary method embodiment shown in FIG. 4. For the sake of clarity, the method is discussed in terms of an exemplary system 100, as shown in FIG. 1, configured to practice the method. The steps outlined herein are exemplary and can be implemented in any combination thereof, including combinations that exclude, add, or modify certain steps.

FIG. 4 illustrates an example method embodiment 400. The system 100 segments, via a processor, a document associated with an event based on a plurality of inferred topics to yield a plurality of segments (402). The event can be a speech, a news report, a status update, a conference, a discussion, a lecture, a debate, a presentation, a public report, an advertisement, and so forth. The document can be, for example, a transcript, summary, description, commentary, compilation, analysis, critique, article, and report associated with the event. The plurality of segments can include topics, words, n-grams, sentences, paragraphs, documents, and so forth. Moreover, the number of inferred topics in the plurality of inferred topics can be determined manually. Alternatively, the number of inferred topics in the plurality of inferred topics can be based on a configured parameter and/or a tuning threshold, such as an accuracy threshold, a topic threshold, a diversity threshold, a timing threshold, etc. While step 402 is discussed in terms of a document associated with an event, this step can be implemented to segment any content, such as one or more articles, opinions, advertisements, images, messages, documents, transcripts, blogs, videos, posts, presentations, etc.

The plurality of inferred topics can be extracted by applying one or more analytical methods on the document. For example, the plurality of inferred topics can be derived using a statistical model, such as a topic model, to extract topics in the document. In one embodiment, the plurality of inferred topics is obtained using an LDA model to discover abstract topics that occur in the document. Here, unlike the standard implementation of LDA, which is applied at the document level and is unable to extract specific messages (e.g., specific tweets), the LDA model in this implementation provides segmentation at a topic level, thus enabling the identification of messages that relate to specific messages. The document can then be segmented according to the topic changes. For example, the document can be auto-segmented based on temporal topic changes. To capture the topic evolvement, each segment and/or paragraph from the document can have a topic indicator, such as a binary topic indicator.

The system 100 then assigns each message in a corpus of messages associated with the event to one of the inferred topics to yield assigned topics (406). For example, the system 100 can associate the words in each tweet with either a specific topic in the event or a general topic of the event based on a variable whose value is chosen from a distribution of segments which is controlled by certain preference parameters. Moreover, the messages can be expanded for context using additional information, such as, for example, snippets from queries to an Internet search engine. The system 100 can also receive additional messages, filter those messages that are descriptive of the event, and use the descriptive messages, either alone or in combination, with the corpus of messages, to identify episodic topics.

In one embodiment, the system 100 identifies the corpus of messages associated with the event by crawling/searching social media. For example, the system 100 can crawl/search social media, such as Twitter, Facebook, Internet forums, blogs, wikis, podcasts, magazines, etc., to identify messages associated with the event (e.g., user responses, user interactions, user feedback, etc.). The system 100 can also identify the corpus of messages by filtering messages based on content. For example, the system 100 can receive messages and filter those that are descriptive of the event, to yield the corpus of messages. Descriptive messages can then be used to identify episodic topics in the event. The corpus of messages can include a status update, a tweet, a blog post, a tag, a chat message, a comment, a check-in, text data, and so forth. In one embodiment, the system 100 identifies a collection of tweets associated with a speech, based on a pre-defined or inferred hashtag associated with the speech.

The system 100 can also filter messages based on time and/or content. For example, the system 100 can fetch messages posted only from the beginning of the event, to thirty minutes after the event. Similarly, when correlating a message to a particular topic or portion of the event, the system 100 can apply a temporal filter. For example, a message can be associated only with topics in the event that occurred prior to the message, since the other topics had not yet occurred at the time the message was created. In addition, the system 100 can filter out noisy terms above a noise threshold from one or more messages in the corpus of messages. For example, the system 100 can remove duplicate messages, non-English messages, punctuation, stop words, etc. The system 100 can also perform stemming for one or more terms in the document and/or corpus of messages.

Finally, based on the assigned topics, the system 100 associates each message in the corpus of messages with at least one of the document, a segment from the plurality of segments, and a segment of the event (408). For example, the system 100 can associate a message with the segment having the most inferred topics assigned to the message. As another example, the words in a message can be matched against a distribution of segments from the event, and the message can be associated with the segment having the most matching words across all words (the top segment).

In one embodiment, the system 100 can cluster the messages by semantic correlations to the plurality of segments. The system 100 can also classify the messages into two categories: general messages, which refer to messages that relate to general topics in the document and/or event; and specific messages, which refer to messages that directly comment on a segment of the document and/or event. Further, the system 100 can be fine-tuned to generate more or less topics to reach an optimum correlation between a message and the document and/or a segment of the event. For example, the number of topics generated can be based on a configured parameter and/or a tuning threshold, such as an accuracy threshold, a topic threshold, a diversity threshold, a timing threshold, etc. Alternatively, the number of topics generated can be specified manually by a user.

In one embodiment, the system 100 uses a joint statistical model to provide a semantic association between the messages and the document. The joint statistical model considers the messages and document jointly to infer topical associations between the messages and the document. The inferred topic distribution is sensitive to the timestamp of the event. This can be advantageous, since both the event (and the document) and its real-time feedback, the messages, are topically-evolving along a temporal dimension. In another embodiment, the system 100 auto-segments a transcript of an event based on topical changes and links semantically related postings on Twitter with different segments in the transcript. Here, the postings are classified into two categories, specific and general, based on whether they relate to a segment of the transcript or the event in general.

The system 100 can also be configured to record and play the event with topically related messages. For example, the system 100 can play the event and display topically related messages. As playback progresses, the topic of the event changes and the system 100 displays a different, topically related message. In one embodiment, the system 100 can play an event that is augmented with a display of related social posts, such as tweets. Moreover, the system 100 can be configured to perform a time-based or topic-based display. Also, the system 100 can be configured to switch from a time-based to topic-based display, and vice versa, based on a parameter, threshold, preference, user request, etc.

Figure 5:
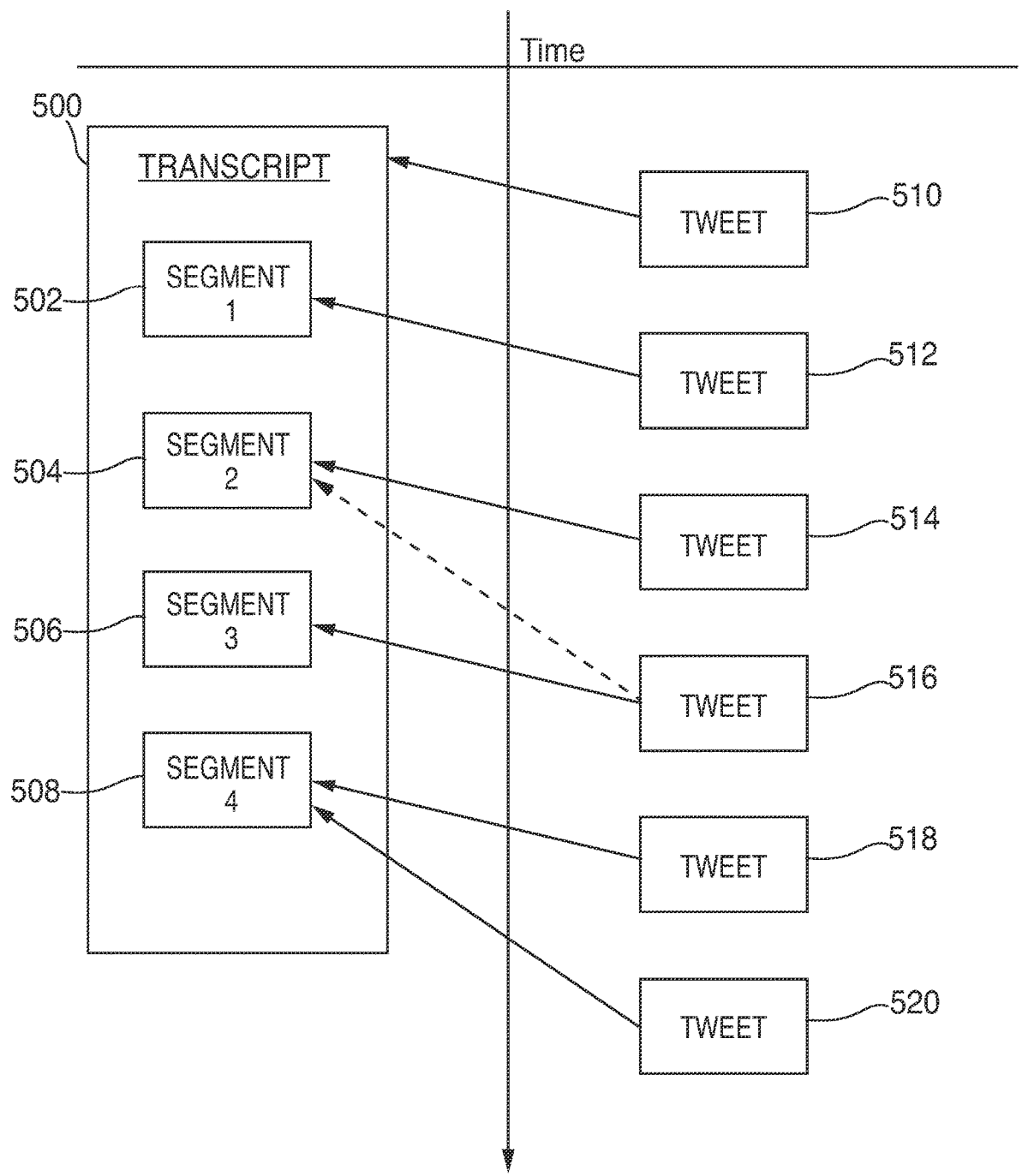
FIG. 5 illustrates an exemplary alignment of messages to a transcript of an event.

FIG. 5 illustrates an exemplary alignment of tweets to a transcript of an event. In this example, the transcript 500 is topically evolving along a temporal dimension. The tweets 510, 512, 514, 516, 518, 520 provide real-time feedback of the event, and are therefore likewise temporally dynamic. The transcript 500 is segmented into segments 502, 504, 506, 508, based on the temporal topic changes in the transcript 500. Thus, each of the segments 502, 504, 506, 508 corresponds to a different topic along the temporal dimension.

To segment the transcript 500, the topics in the transcript 500 are first extracted using one or more analytical methods. For example, the topics in the transcript 500 can be extracted using a statistical model, such as a topic model. In one embodiment, an LDA model is used to discover abstract topics that occur in the transcript 500. Once the topics have been extracted, the transcript 500 can be segmented according to the topic changes. For example, the transcript 500 can be segmented based on the temporal topic changes.

In FIG. 5, the tweets 510, 512, 514, 516, 518, 520 are aligned to the transcript 500 and/or segments 502, 504, 506, 508, based on their topical connections. To this end, a semantic analysis of the tweets 510, 512, 514, 516, 518, 520 is performed to extract their respective topics. For example, the topic distributions can be extracted through an LDA-based analysis of the tweets 510, 512, 514, 516, 518, 520. Here, an LDA model can be used to discover abstract topics that occur in the tweets 510, 512, 514, 516, 518, 520.

Further, the tweets 510, 512, 514, 516, 518, 520 are classified into two categories, general and specific, based on whether they are topically related to the transcript 500 in general or a specific segment 502, 504, 506, and/or 508. The tweets 510, 512, 514, 516, 518, 520 are then aligned to the transcript 500 and/or a specific segment 502, 504, 506, and/or 508, according to their topical connections.

For example, tweet 510 is classified as a general tweet because it is topically related to the transcript 500 in general. Accordingly, tweet 510 is aligned to the transcript 500. On the other hand, tweet 512 is classified as a specific tweet because it is topically related to segment 502. As a result, tweet 512 is aligned to segment 502, based on their topical connection. Similarly, tweet 514 is aligned to segment 504 because it is a specific message, topically related to segment 504. Further, tweet 516 includes a portion that is topically related to segment 506, and a portion that is topically related to segment 504. As a result, tweet 516 is aligned to segments 504 and 506. Finally, tweets 518 and 520 are both topically related to segment 508 and, therefore, both tweets 518 and 520 are aligned to segment 508.

The topical connections between the tweets 510, 512, 514, 516, 518, 520 and the transcript 500 and/or segments 502, 504, 506, 508 can be determined using a statistical model. In one embodiment, a joint statistical model is used to determine the topical connections between the tweets 510, 512, 514, 516, 518, 520 and the transcript 500 and the segments 502, 504, 506, 508. The joint statistical model can identify the topics in the tweets 510, 512, 514, 516, 518, 520 and the transcript 500. The joint statistical model can then model the tweets 510, 512, 514, 516, 518, 520 and the transcript 500. In this example, the joint statistical model considers the tweets 510, 512, 514, 516, 518, 520 and the transcript 500 jointly to infer the topical connections.

FIG. 6 illustrates an exemplary segmentation of a transcript 600 based on temporal topic changes. In this example, the transcript includes several segments and each segment has unique topics, which are discussed within one or more paragraphs in a sequential manner. The topics in the transcript are extracted using a statistical model, and the transcript is automatically segmented into ten segments (1-10), based on their topical change. FIG. 6 illustrates the segments (1-10) and the topic distribution for each segment. Here, the segment id 602 identifies the specific segments, and the topic words 604 illustrate the topic distribution for each segment. Here, the topics are dynamic and evolve with time.

Once the transcript is segmented based on the temporal topic changes, a joint statistical model is used to link semantically related textual content from real-time feedback (e.g., tweets, messages, chats, etc.) with different segments in the transcript. This is further illustrated in FIG. 7, discussed next.

FIG. 7 illustrates an example of an inferred topical association between a speech and a set of tweets 700. In this example, a joint statistical model is used to infer topical associations between the speech and tweets. According to the inferred topical associations, the tweets are linked to a specific segment 706 and/or the general speech 708. In particular, the specific tweets 710, those which directly comment on the specific segment 706, are linked with the specific segment 706 based on their topical connection. On the other hand, the general tweets 718, those which comment on the general speech 708, are linked with the general speech 708 based on their topical connection.

For example, the first tweet 712 is a direct response to the following paragraph within the specific segment 706: "Today, I want to talk about this change—the forces that are driving it and how we can respond in a way that advances our values and strengthens our security." The first tweet 712 is thus linked to the specific segment 706 based on this topical connection.

Similarly, the second tweet 714 and the third tweet 716 are direct responses to the following paragraph within the specific segment 706:

The State Department is a fitting venue to mark a new chapter in American diplomacy. For six months, we have witnessed an extraordinary change taking place in the Middle East and North Africa. Square by square, town by town, country by country, the people have risen up to demand their basic human rights. Two leaders have stepped aside. More may follow.

Accordingly, the second tweet 714 and the third tweet 716 are linked to the specific segment 706 based on this topical connection.

Figure 8:
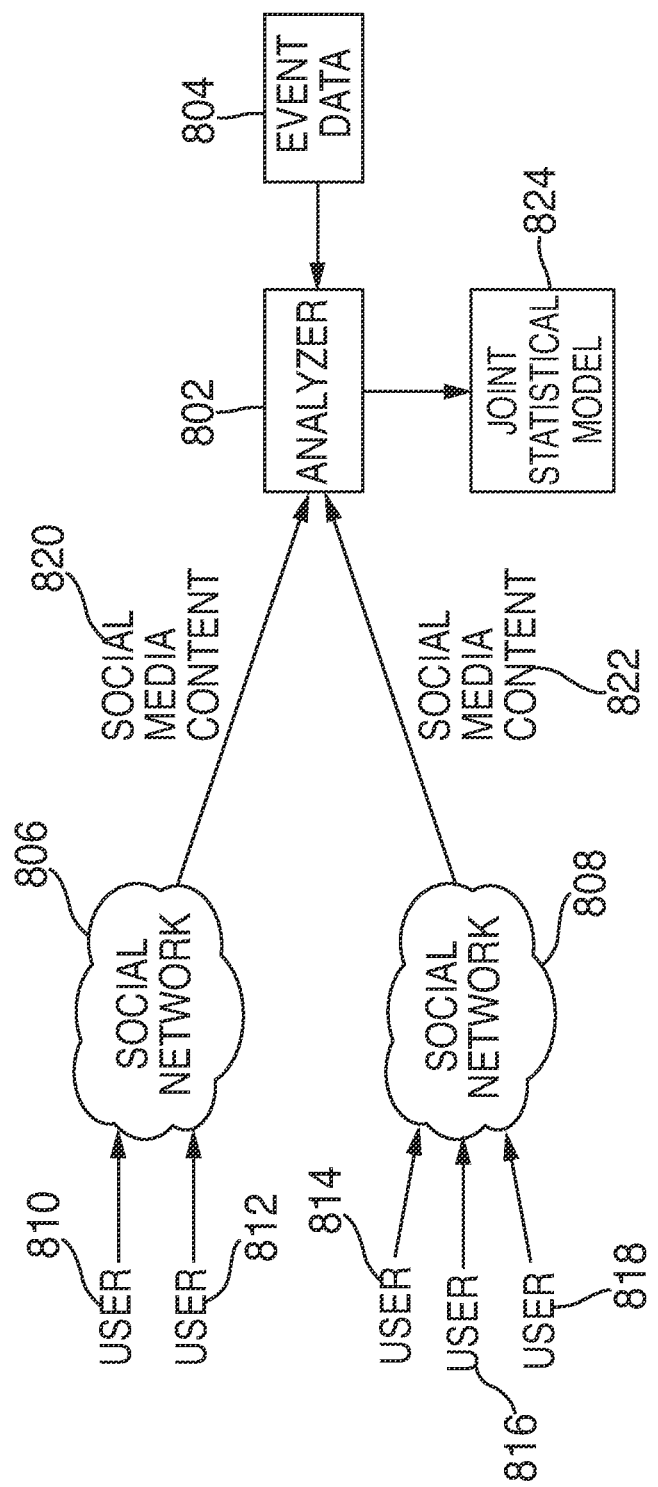
FIG. 8 illustrates an exemplary diagram of a system for developing a joint statistical model of event data and social media content.

FIG. 8 illustrates an exemplary diagram 800 of a system for developing a joint statistical model of event data and social media content. In this example, the analyzer 802 applies analytical methods on event data 804 and social media content 820, 822 to obtain a deeper understanding of the user feedback on events through social media. Specifically, the analyzer 802 infers topical associations between the event data 804 and social media content 820, 822 through a semantic analysis of the event data 804 and social media content 820, 822. To this end, the analyzer 802 develops a joint statistical model 824 of the event data 804 and social media content 820, 822 based on their topical connections. Here, the analyzer 802 can provide a semantic association between the event data 804 and the social media content 820, 822.

The analyzer 802 can be a software application stored on one or more computing devices. For example, the analyzer can be a web-based application on a server configured to analyze the event data 804 and social media content 820, 822. The analyzer 802 can also be configured to crawl/search the social networks 806, 808 and the Internet for the social media content 820, 822. The event data 804 can be an article, an advertisement, an announcement, a message, a report, a transcript, and so forth. For example, the event data 804 can be a transcript of an event, such as a speech, a news report, a conference, a discussion, a lecture, a debate, a presentation, a movie, a competition, etc. The social media content 820, 822 can include social posts by users 810-818 on the social networks 806, 808. Moreover, the social media content 820, 822 can include other types of user feedback, such as messages, comments, status updates, tweets, check-ins and so forth.

To infer the topical associations, the analyzer 802 first extracts the topics in the event data 804 using an LDA-based analysis, for example, and segments the event data 804 based on the temporal topic changes. The analyzer 802 similarly extracts the topic distributions from the social media content 820, 822 through an LDA-based analysis. The analyzer 802 then determines the topical associations between the social media content 820, 822 and the segments in the event data 804. The analyzer 802 can also cluster the social media content 820, 822 by semantic correlations to the segments in the event data 804.

In one embodiment, the analyzer 802 analyzes the social media content 820, 822 and the event data 804 to model their topical connections. To this end, the analyzer 802 first identifies the topics in the social media content 820, 822 and the event data 804. Here, the analyzer can extract the topics using an LDA-based analysis, for example. The analyzer 802 then builds a joint statistical model 824 of the social media content 820, 822 and the event data 804 based on their topical associations. In building the joint statistical model 824, the analyzer 802 considers the interrelated topic mixtures between the social media content 820, 822 and the event data 804. Here, the analyzer 802 considers the social media content 820, 822 and the event data 804 jointly to infer topical associations, and links semantically related posts in the social media content 820, 822 with different segments in the event data 804.

FIG. 9 illustrates an example of an event augmented with a display of related tweets. The system 900 is configured to record and play an analyzed event with a display of topically related tweets. In this example, the analyzed event is a World Cup soccer match. The system 900 in FIG. 9 is illustrated displaying a segment 904 in the World Cup soccer match corresponding to an inferred topic, in this case a penalty kick in the match. As the system 900 displays the segment 904, it simultaneously displays the related tweets 908, 910, which are tweets associated with the segment 904. To this end, the system 900 can include an event portion 902, which displays the event as it is played, and a tweet portion 906, which displays the tweets associated with the particular segment of the event in the event portion 902.

Moreover, the system 900 can be configured to perform a time-based or topic-based display. Also, the system 900 can be configured to switch from a time-based to topic-based display, and vice versa, based on a parameter, threshold, preference, user request, etc.

In another embodiment, the system 912 includes an event portion 914, which displays the event as it is played, but does not include a display of tweets. Here, as playback of the event progresses on the system 912, a tweet 918 associated with a particular segment of the event can be displayed on a separate device 916. For example, as the system 912 plays the event, the topically related tweets can be displayed on a mobile device.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein can be applied to live events, recorded events, and can incorporate comments from one or more social media services, such as Twitter, Facebook, blog posts, and so forth. Those skilled in the art will readily recognize various modifications and changes that may be made to the principles described herein without following the example embodiments and applications illustrated and described herein, and without departing from the spirit and scope of the disclosure.

We claim:

1. A method comprising:
    segmenting, via a processor, a text document associated with an event based on a plurality of inferred topics to yield a plurality of text segments, wherein the plurality of inferred topics is obtained by applying a statistical model to the text document;
    assigning each message in a corpus of messages associated with the event to one of the inferred topics to yield assigned topics, wherein the corpus of messages originates from sources other than the event and other than the text document, and wherein the corpus of messages is generated during the event;
    based on the assigned topics, associating the each message in the corpus of messages with at least one of the text document, a text segment from the plurality of text segments, or a segment of the event; and ranking the plurality of text segments based on how many messages in the corpus of messages are associated with each of the plurality of text segments.

2. The method of claim 1, wherein associating the each message in the corpus of messages with at least one of the text document, the text segment from the plurality of segments, or the segment of the event is also based on a joint statistical model of the corpus of messages and at least one of the text document or the event.

3. The method of claim 1, wherein segmenting the text document is based on a Latent Dirichlet Allocation analysis.

4. The method of claim 1, wherein assigning the each message in the corpus of messages to the one of the inferred topics is based on a Latent Dirichlet Allocation analysis.

5. The method of claim 1, wherein associating the each message in the corpus of messages with at least one of the text document, a text segment from the plurality of text segments, or a anent of the event is also based on time, location, frequency, metadata, syntax, or user information.

6. The method of claim 1, wherein the each message in the corpus of messages comprises at least one of a status update, a tweet, a blog post, a tag, a chat message, a comment, or a check-in.

7. The method of claim 1, wherein associating the each message in the corpus of messages to at least one of the text document, the text segment from the plurality of text segments, or the segment of the event further comprises:
calculating a term-vector similarity for the each message in the corpus of messages to each of the plurality of segments.

8. The method of claim 1, further comprising filtering out noisy terms above a noise threshold from a respective message in the corpus of messages.

9. The method of claim 1, further comprising associating words in the each message in the corpus of messages with at least one of a specific topic in the event or a general topic in the event.

10. The method of claim 1, wherein the text document comprises at least one of a transcript, a description, a summary, a report, or an article.

11. The method of claim 1, wherein the corpus of messages comprises a combination of data from a plurality of social networks.

12. The method of claim 1, wherein the plurality of text segments comprises a second segment from a second document associated with the event.

13. The method of claim 1, wherein associating the each message in the corpus of messages to at least one of the text document, the text segment from the plurality of text segments, or the segment of the event further comprises inferring topical associations between the corpus of messages and at least one of the text document or the event.

14. The method of claim 1, further comprising:
adding external information to a message from the corpus of messages; and
using the external information to assign the message to one of the inferred topics in the plurality of inferred topics.

15. The method of claim 1, further comprising:
identifying a topic of a message in the corpus of messages;
identifying additional information related to the topic; and
expanding the message based on the additional information.

16. A system comprising:
a processor; and
a computer-readable medium storing instructions which, when executed by the processor, cause the processor to perform operations comprising:
segmenting a text document associated with an event based on a plurality of inferred topics to yield a plurality of text segments, wherein the plurality of inferred topics is obtained by applying a statistical model to the text document, and further wherein a number of inferred topics in the plurality of inferred topics is based on a tuning threshold;
assigning each message in a corpus of messages associated with the event to one of the inferred topics to yield assigned topics, wherein the corpus of messages originates from sources other than the event and other than the text document, and wherein the corpus of messages is generated during the event;
based on the assigned topics, associating each message in the corpus of messages with at least one of the text document, a text segment from the plurality of text segments, or a segment of the event; and
ranking the plurality of text segments based on how many messages in the corpus of messages are associated with each of the plurality of text segments.

17. The system of claim 16, wherein the corpus of messages comprises a combination of data from a plurality of social networks.

18. The system of claim 16, the computer-readable medium storing additional instructions which, when executed by the processor, cause the processor to perform further operations comprising:
receiving a plurality of messages;
filtering the plurality of messages to yield a set of messages that are descriptive of the event; and
identifying episodal topics in the event based on the set of messages.

19. A device comprising:
a processor;
a communication interface; and
a computer-readable memory storing instructions which, when executed by a processor, cause the processor to perform operations comprising:
segmenting a text document associated with an event based on a plurality of inferred topics to yield a plurality of text segments, wherein the plurality of inferred topics is obtained by applying a statistical model to the text document;
assigning each message in a corpus of messages associated with the event to one of the inferred topics to yield assigned topics, wherein the corpus of messages originates from sources other than the event and other than the text document, and wherein the corpus of messages is generated during the event;
based on the assigned topics, associating each message in the corpus of messages with at least one of the text document, a text segment from the plurality of text segments, or a segment of the event;
ranking the plurality of text segments based on how many messages in the corpus of messages are associated with each of the plurality of text segments, and
causing to be displayed, via an output device, an augmented version of the event, wherein the augmented version of the event comprises at least part of the event and a topically related message from the corpus of messages.

20. The device of claim 19, wherein the augmented version of the event comprises at least one of a time-based display or a topic-based display.

* * * * *

UNITED STATES PATENT AND TRADEMARK OFFICE
CERTIFICATE OF CORRECTION

PATENT NO. : 11,055,334 B2
APPLICATION NO. : 13/370488
DATED : July 6, 2021
INVENTOR(S) : Yuheng Hu, Ajita John and Doree Duncan Seligmann Page 1 of 1

It is certified that error appears in the above-identified patent and that said Letters Patent is hereby corrected as shown below:

In the Claims

At Column 17, Line 18, delete "anent" and insert --segment-- therein.

Signed and Sealed this
Fourteenth Day of September, 2021

Drew Hirshfeld
*Performing the Functions and Duties of the*
*Under Secretary of Commerce for Intellectual Property and*
*Director of the United States Patent and Trademark Office*